V. F. KING.
STORE SERVICE SYSTEM.
APPLICATION FILED DEC. 15, 1910.
1,122,608.
Patented Dec. 29, 1914.
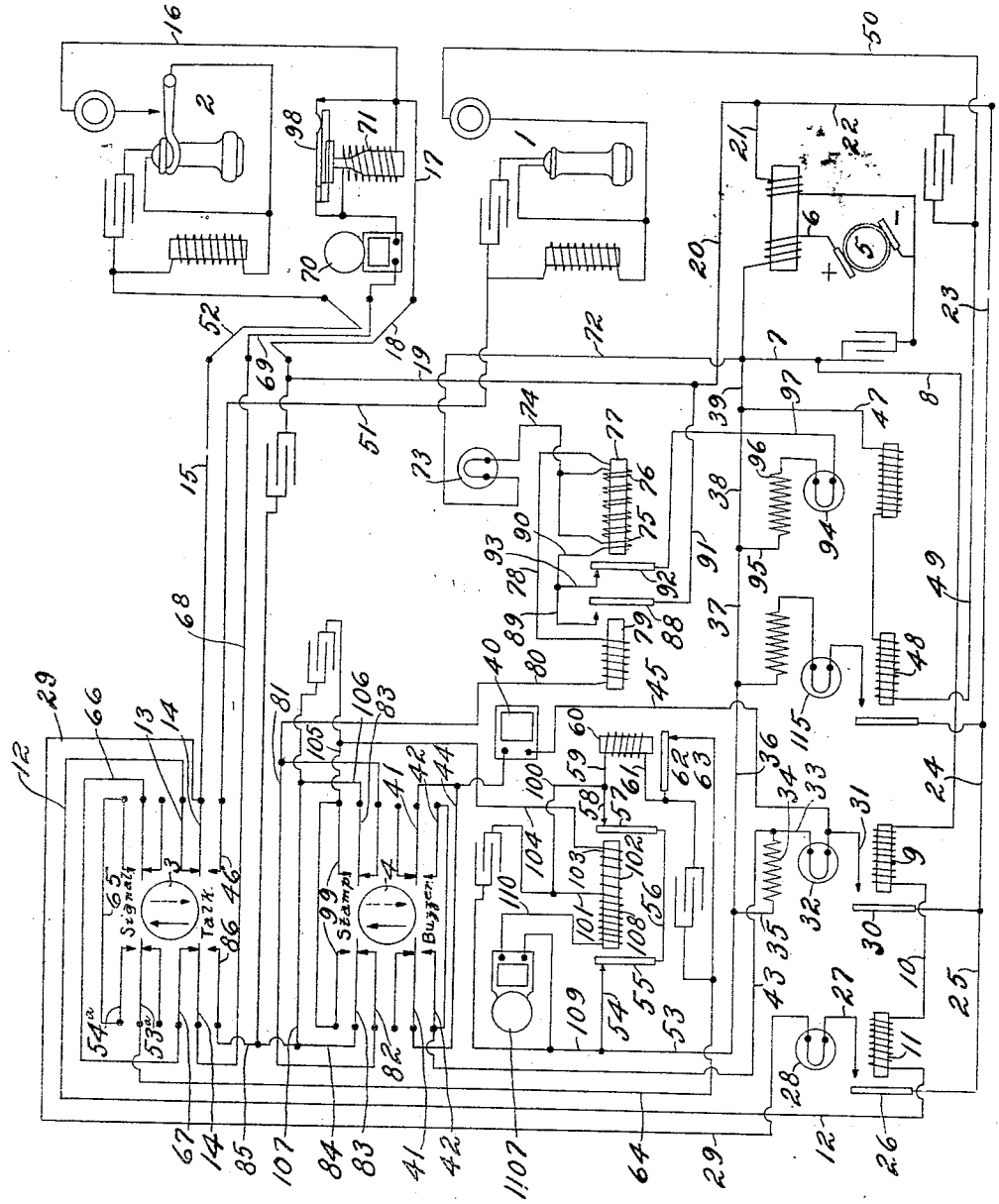
WITNESSES:
INVENTOR
Vernon F. King
BY
and R. C. Glass
ATTORNEYS.

UNITED STATES PATENT OFFICE.

VERNON F. KING, OF DAYTON, OHIO, ASSIGNOR TO THE NATIONAL CASH REGISTER COMPANY, OF DAYTON, OHIO, A CORPORATION OF OHIO, (INCORPORATED IN 1906.)

STORE-SERVICE SYSTEM.

1,122,608.   Specification of Letters Patent.   Patented Dec. 29, 1914.

Application filed December 15, 1910. Serial No. 597,403.

*To all whom it may concern:*

Be it known that I, VERNON F. KING, a citizen of the United States, residing at Dayton, in the county of Montgomery and State of Ohio, have invented certain new and useful Improvements in Store-Service Systems, of which I declare the following to be a full, clear, and exact description.

This invention relates to store service systems, and has for its main object to provide mechanism for assisting in the authorization of credit sales. In many commercial houses the problem of compelling sales persons to secure proper authorization before making a sale on credit is a very important one. It is obviously unsafe in most cases to trust the judgment of the clerk as to whether credit should be allowed, and to compel a message being sent to some credit man who is authorized to allow credit, is a lengthy and tedious proceeding. In many cases an improvement has been made by using the telephone, over which the credit man is communicated with; but even in such cases there is nothing to show that the credit man really authorized any particular transaction, and it must depend ultimately upon the word of the clerk.

The invention is designed, therefore, to obviate this difficulty by providing a means for making a permanent record on a sales slip authorizing credit in a particular case, and so arranging the devices that the means can only be operated by the credit man and not by the clerk. In particular an electrically-operated device is provided to stamp an inserted sales slip, and electrical connections to the credit man's desk are also provided with means for controlling a stamping device from that point.

Another object of the invention is to provide improved means for operating the signaling means which indicates the presence or absence of the slip to be marked.

A further object of the invention is to operate the marking device and the clerk's signaling means over the same line thereby dispensing with considerable wiring.

With these and incidental objects in view, the invention consists in certain novel features of construction and combinations of parts, the essential elements of which are set forth in appended claims, and a preferred form of embodiment of which is hereinafter described with reference to the drawing which accompanies and forms part of this specification.

The drawing is a diagrammatic view of the various circuits comprising the invention.

In this system a telephone is provided for the clerk or cashier-inspector, and a circuit is run to a switch-board at the credit man's desk. When credit is to be authorized, the clerk calls the credit man in the usual way by raising the telephone receiver from the hook. This notifies the credit man that his attention is desired, by a lamp signal, as shown in this particular embodiment. He then connects his telephone set with that of the clerk and actuates a signal at the clerk's station to indicate that he is ready to be communicated with. The clerk then reads off the amount of the sale and name of the customer desiring credit, and if such credit is to be given the credit man then operates a switch controlling the stamp and causes an impression to be made on the sales slip authorizing the credit. If, however, the credit is not to be given the credit man can communicate over the telephone with the clerk and give whatever instructions are necessary, such as a request that the customer call at the office.

The invention will now be described more particularly and the various circuits traced in the order they are made during a complete operation of the invention.

The reference numeral 1 indicates the telephone set at the credit station and 2 the telephone set at the clerk's station, while 3 and 4 indicate the keys for establishing various circuits and which are under the control of the credit man. The clerk when desiring to call the credit man, raises the receiver from the hook in the usual way, and a circuit is then made from a generator 5 through wires 6, 7, and 8, relay 9, wire 10, relay 11, wire 12, contacts 13 and 14, wires 15, 52, telephone set 2 and wires 16, 17, 18, 19, 20 and 21 back to the generator. This energizes relays 9 and 11 and circuits are thereby closed through the line and pilot lamps as follows: line lamp; generator 5, wires 6, 7 and 8, relay 9, wire 10, relay 11, wire 12, contacts 13 and 14, wire 29, lamp 28, wire 27, armature 26, and wires 25, 24, 23, 22 and 21 to the generator. Pilot lamp; generator 5, wires 6, 39, 38, 37, 36 and 35, resistance 34 wire, 33, lamp 32, wire 31, 110 armature 30 of relay 9 and wires 24, 23, 22 and 21 to the generator 5. The lighting of the pilot lamp will indicate that one of the clerks wishes to communicate with the credit man and the line lamp will indicate the particular station at which the clerk is employed. If desired, a buzzer 40 may be connected in parallel with the pilot lamp 32 for use in case the credit man desires to leave his desk temporarily. This buzzer as shown, is normally disconnected, and is connected by moving the switch key 4 in the direction of the dotted arrow shown on said key, which movement will bring contacts 41 into engagement with contacts 42 and the circuit through the buzzer will be completed as follows: generator 5, wires 6, 39, 38, 37, 36, 35, resistance 34, wire 43, contacts 42, 41, wire 44, buzzer 40, wires 45, 31, armature 30 and wires 24, 23, 22 and 21 back to the generator 5. In such case the buzzer 40 will be sounded whenever the pilot lamp 32 is lighted, thus audibly calling attention to the desire for communication.

It will be seen that the arrangement of circuits just described differs from that used in general telephone work in that the line lamp 28 will not be extinguished if the telephone receiver is replaced on its hook. In many modern telephone exchanges lamp signals are used in place of the older annunciator drop and these signals are controlled by relays whose circuit is made by removing the receiver from its hook permitting the same to close a contact. When the receiver is restored, however, the relay is deenergized. In the system disclosed in the present invention the lamp 28 is, it is true, controlled by relay 11 which brings armature 26 in contact with wire 27 and makes circuit as previously traced through the lamp, but it will be seen that this lamp circuit also passes through the coil of relay 11 and thereby retains armature 26 in contact with wire 27. This latter relay is therefore a locking relay and maintains its own circuit closed. To extinguish lamp 28 it is necessary to move switch key 3 in the direction of the dotted arrow and thereby disconnect the contacts 13 and 14. The circuit for the line lamp 28 also passes through the pilot relay 9 so as to keep the armature 30 of said relay in contact with the wire 31 and thereby keep the circuit for the pilot lamp 32 established as long as the circuit for the line lamp remains established.

The movement of the switch key 3 in the direction of the dotted arrow to extinguish the line and pilot lamps as above described moves the contact 14 into engagement with a contact 46 by which the talking circuit is established. This circuit includes the generator 5, wires 6, 39 and 47, supervisory relay 48, wires 49 and 50, telephone set 1, wire 51, contacts 46, 14 wires 15 and 52 telephone set 2, wires 16, 17, 18, 19, 20 and 21 back to the generator 5. With the system as shown, it is not necessary that the clerk should keep the receiver to his or her ear until the credit man answers, as means are provided for sounding an alarm, as, for example, by a bell at the clerk's station when the credit man is ready to answer. This means includes the switch key 3, which when moved in the direction of the full line arrow shown thereon will close contacts 53ª and 54ª and thereby the signal circuit as follows: generator 5, wires 6, 39, 38, 37, 36, 53, contact 54, armature 55, wire 56, armature 57, contact 58, wire 59, interrupter 60, wire 61, armature 62, wires 63 and 64, contacts 53ª and 54ª, wire 65, contacts on the opposite side of the key 3, from the contacts 53ª and 54ª, and which are duplicates thereof, wire 66, contacts 67 and 14, wires 68 and 69, bell 70, stamp 71, and wires 17, 18, 19, 20 and 21 to the generator. It will readily be seen that as soon as the circuit is completed through the interrupter magnet 60, the armature 62 will be attracted, thus immediately breaking the circuit including the bell 70. Immediately upon the breaking of the circuit, the armature 62 will be released and allowed to spring back to normal position, thus again closing the bell circuit and in this way forming an interrupter to cause the necessary pulsations of current over the circuit including the bell 70. The bell 70 may be of any ordinary form employing one or more magnets and an armature carrying a bell striking hammer. In many well known forms of bells the interrupter forms part of the bell proper but in the present instance it is divorced from the bell construction and located at the central switch board for the reason that when several different operators' stations are provided, only one interrupter mechanism need be employed, thus greatly reducing the possibility of trouble being caused thereby. It is desirable so to divorce the interrupter from the bell, as the bell is in series with a validating stamp, and consequently, when the circuit is closed to operate the stamp, it would not be desired to have an interrupter in the circuit as will hereinafter readily be seen. When the signal circuit is made as above described the coils of the stamp 71 and of the interrupter 60 offer sufficient resistance to prevent the actuation of the stamp. Generally the signal circuit is made when no paper is in the stamp and in this case the stamp is short circuited as at 98 as hereinafter described and any danger of operating the stamp when signaling is entirely overcome.

From the talking and signaling circuits as above described it will be seen that communication may be had over the talking circuit when the switch 3 is moved in the direction of the dotted arrow to close the contacts 14 and 46, and if the credit man desires to call the clerk's attention when he or she has taken the receiver away from his or her ear, it may be done by throwing the switch 3 in the direction of the full line arrow to close the contacts 53ª and 54ª and thereby the circuit through the bell 70.

It is to be understood that there is one of the switch keys 3 for each clerk's station in the system and by the use of said keys the ordinary plug and jacks as used in telephone practice are done away with. In a system employing a number of stations considerable time is saved by the credit man in answering calls where individual switches are employed instead of the cord plug which is common to all of the station jacks.

During communication between the credit man and the clerk means are provided to indicate the absence or presence of the slip to be stamped so that in case the amount of credit asked for meets with the approval of the credit man he may close the circuit for stamping the slip as hereinafter described, and if the slip is not in place may notify the clerk of the fact. The means for indicating to the credit man the absence or presence of the slip to be stamped, as herein shown, comprises a flash lamp and a circuit for the same including the generator 5, wires 6 and 72, resistance lamp 73, wire 74 which is connected to oppositely wound coils 75 and 76 furnishing a differential relay 77, a wire 78 connected to the coil 75, flash relay 79, wires 80, 81, contacts 82, 83, wires 84, 85, contacts 86, 14 closed by switch 3 when in "talking" position, wires 68, 69, bell 70, stamp 71, and wires 17, 18, 19, 20 and 21, back to the generator. As the current passes over the above described circuit it energizes the relay 79 therein, so to bring its armature 88 into contact with wire 89 and thereby close a circuit to permit a part of the current to pass over the coil 76, through wires 90, 89, armature 88, wires 91, 20 and 21 to the generator. The coils 75 and 76 of the relay 77 are oppositely wound to counteract each other's influence on the relay so that when the current flows through said coils as just described, the relay 77 will have no effect on its armature 92 which is suitably held in contact with a wire 93 branching from the wire 90 and an additional circuit is completed for a flash lamp 94, which includes the generator 5, wires 6, 39, 38 and 95, resistance coil 96, lamp 94, wire 97, armature 92, wires 93, 89, armature 88, and wires 91, 20 and 21, back to the generator. This last described circuit illuminates the lamp 94 and indicates to the credit man that the slip is in position to be stamped. If the slip is not in position the circuit including contacts 86 and 14 closed by the switch 3 will be short circuited as at 98 about the stamp 71 so that the equivalent resistance of the stamp circuit will be much diminished thereby unbalancing the counter-acting effect of the coils 75 and 76 to such an extent that the relay 77 will be energized and attract its armature 92 and thereby break the circuit through the flash lamp 94, which indicates to the credit man that the slip is not in position to be stamped.

Heretofore in systems of this general nature, such as disclosed in Letters Patent of the United States No. 975,533, issued November 15, 1910, and an application for Letters Patent of the United States, Serial No. 301,707, filed February 17, 1906, and both covering inventions of Charles F. Kettering assignor to the present applicant's assignee, there have been provided local batteries for energizing the relays which control the means for indicating the absence or presence of the slip to be marked but owing to the excessive demand on these batteries in systems of this kind in large department stores it was found necessary frequently to replace these batteries which required the suspension of the operation of this part of the system during the time taken up by the installation of new batteries.

By the above described means for operating the flash lamp it will be seen that the current required to operate said lamp is taken from the dynamo which generates the current for the other parts of the system thereby doing away with the local batteries and it is desired to claim this feature of the invention broadly without regard to the character of the mechanism employed for accomplishing the result.

After the credit man has ascertained that the slip representing the approved transaction is in position to be stamped, he moves switch 4 in the direction of the full line arrow shown thereon, at the same time retaining the switch 3 in "talking" position. This movement of switch 4 closes contacts 83 and 99 and forms the following circuit through the stamp 71: generator 5, wires 6, 39, 38, 37, 36, 53, 54, armature 55, wire 56, armature 57, wires 58, 100 and 101, low resistance coil 102 of a circuit breaker 103, wires 104 and 105, contacts 99, 83, wires 106, 107 and 85, contacts 86, 14, wires 68, 69, bell 70, stamp 71 and wires 17, 18, 19, 20, and 21, to the generator. In the usual operation of the apparatus, this will stamp the inserted slip and complete the operation, but a device is also provided so that if the credit man should attempt to operate the stamp while it is short-circuited from no paper having been inserted, an additional signal will be brought into operation to serve in conjunction with flash lamp 94 to announce to the credit man that the sales slip has not been inserted in the stamp. This device comprises a single stroke bell 1107 connected in series with a high resistance winding 108 of circuit breaker 103. If an attempt is made to close contacts 83 and 99 while stamp 71 is short-circuited at 98, a circuit of very low resistance will be made, including short-circuit 98 and the low-resistance winding 102 of circuit breaker 103. This would allow a large amount of current to flow over the wire, enough possibly to cause damage to the system, by burning out some part thereof, and means are therefore provided for throwing into circuit under such conditions the high resistance coil 108 of circuit breaker 103. When the stamp 71 is short-circuited, as above described, the circuit breaker 103 will be energized sufficiently to attract the armatures 55 and 57 and thereby break the circuit between the armatures and the wires 54 and 58, the circuit being then completed through wire 109 branching from wire 53, bell 1107, wire 110, resistance coils 108, 102 and then continuing throughout the circuit previously described in connection with the stamping operation. It is evident from this structure that if much current comes over the line through the low resistance winding 102 of circuit breaker 103, then the armature thereof will be energized, breaking contacts between the armatures and wires 54 and 58 and causing the current to proceed through the signal device 1107 and over the high resistance winding 108. This both reduces the current to a value such that no damage will be caused to the system, and also announces to the credit man that no slip has been inserted in the stamping device. If, on the other hand, a slip has been inserted, thereby breaking the circuit over the wire 98 and compelling the current to traverse the stamp coil, there will then be enough resistance in the line to prevent the armature of circuit breaker 102 from throwing in the high resistance winding and the alarm device 1107, so that this signal will then not be operated.

From the above description it will be seen that wire 68 is used for both the stamping and ringing circuits thereby doing away with the independent wires required in the systems described in the above mentioned applications of C. F. Kettering, and thus rendering the system less liable of getting out of order and effecting a considerable saving in the cost of installation of same.

While there is provided a switch key 3 for each station in the system, there is only a single switch 4 which is common to all of the stations. A lamp 115 is controlled by the relay 48 which is in the talking circuit and performs a similar function to the supervisory lamps commonly used in telephone practice.

It is thought that a detailed description of the stamp need not be given as the same is fully shown and described in the above mentioned patent and application.

While certain directions and methods of operation have been described in connection with the system shown, it is to be understood that the invention is not limited to the exact methods of operation described but the same may be varied to a considerable extent without departing from the scope of the invention.

While the form of mechanism shown herewith and described is admirably adapted to fulfil the objects primarily stated it is to be understood that it is not intended to confine the invention to the one form of embodiment herein shown and described as it is susceptible of embodiment in various forms all coming within the scope of the claims which follow.

One of the features of the invention claimed herein is the employment of the interrupter 60 at the credit station for varying the electrical condition of a circuit passing through the stamp coil 71 and bell 70 at a clerk's station, whereby when the interrupter is in circuit with the bell and the stamping device when the key 3 is in signal position, the impedance of the stamp coil prevents operation of the stamp while permitting continuous operation of bell 70, having considerably less impedance. This is because of the fact that when the interrupter 60 is in circuit with the bell 70 and stamp coil 71, the pulsations created thereby will not be of sufficient duration to energize the coil 71 to the extent necessary to operate its movable core. On the other hand when the switch lever 4 is moved to stamping position, the circuit will be closed through the bell 70 and stamp coil 71 omitting, however, the interrupter 60. Consequently the current passing through the bell and stamp will be a steady current and the coil 71 will be energized to an extent sufficient to operate its movable core.

What is claimed is:

1. In a system of the class described, the combination with a telephone line including a pair of telephone instruments; of a marking device located at one of the instruments; a switch controlling the operation of said marking device and located at the other instrument; means for indicating the presence or absence of the article to be marked; a relay controlling the operation of the indicating means; a single source of electrical current; and electrical connections therefrom to the telephone line, the marking device, and the relay controlling the indicating means.

2. In a system of the class described, the combination with a telephone line including a pair of telephone instruments; of a marking device located at one of the instruments; a switch controlling the operation of said marking device located at the other instrument; a flash lamp for indicating the presence of the article to be marked; a relay controlling the operation of the lamp; and electrical connections from a single source of electric current to the telephone line, the marking device, the flash lamp and the relay controlling the latter.

3. In a system of the class described, the combination with an electrically controlled stamping device; of a switch located at a distance therefrom for controlling the operation of said stamping device; means for indicating the presence of the article to be stamped; a relay controlling the operation of said indicating means; and electrical connections from a single source of electric current for operating the stamping device and the relay controlling the indicating means.

4. In a system of the class described, the combination with an electrically controlled stamping device, of a switch located at a distance therefrom for controlling the operation of said stamping device, a flash lamp for indicating the presence of the article to be stamped, a relay for closing the circuit for the lamp, a second relay in circuit with the stamping device for breaking the lamp circuit controlled by the article to be stamped, and electrical connections whereby a single source of electric current may be employed for operating the stamping device, the lamp and both of said relays.

5. In a system of the class described, the combination with an electromagnet having two oppositely wound coils of normal electrical equilibrium and an armature normally unaffected thereby, of an electrically controlled stamp in circuit with one of the magnet coils, means for changing the resistance of the stamp circuit whereby to destroy the equilibrium of said coils and effect an operation of the armature, and a lamp with a circuit therefor controlled by said armature.

6. In a system of the class described, the combination with an electromagnet having two oppositely wound coils and an armature, of a circuit wire branching to both of said coils, an electrically controlled stamp in circuit with one of said magnet coils, means for changing the resistance of the stamp circuit, and a lamp with a circuit therefor controlled by said armature.

7. In a system of the class described, the combination with an electromagnet having two oppositely wound coils and an armature, of a circuit wire branching to both of said coils, an electrically controlled stamp and a singly wound magnet in circuit with one of said coils, means for changing the resistance of said stamp circuit, a lamp, and a circuit therefor including the armatures of both said magnets.

8. In a system of the class described, the combination with an electromagnet having two oppositely wound coils and an armature, of a circuit wire branching to both of said coils, an electrically controlled stamp in circuit with one of said coils, means for changing the resistance of said stamp circuit, and a lamp with a circuit therefor including said armature and shunted around said first mentioned wire and said stamp.

9. In a system of the class described, the combination with an electromagnet having two oppositely wound coils and an armature; of a circuit wire branching to both of said coils; an electrically controlled stamp in circuit with one of said coils; a manually operated key controlling contacts included in said stamp circuit; means for changing the resistance of said stamp circuit; and a lamp, with a lamp circuit controlled by said armature.

10. In a system of the class described, the combination with an electromagnet having two oppositely wound coils and an armature, of a circuit branching through both of said coils, an electrically controlled stamp in circuit with one of said coils, means for changing the resistance of said stamp circuit, and a signal controlled by said magnet armature.

11. In a system of the class described, the combination with an electromagnet having two coils, of circuits in shunt to each other and including the two coils of said magnet respectively, an electrically controlled stamp, means coöperating with the stamp for changing the resistance of one of the shunt circuits, and a signal controlled by said magnet.

12. In a system of the class described, the combination with a doubly wound electromagnet, of circuits in shunt to each other and including the two windings of said magnet respectively, said circuits being arranged to balance each other and thereby to prevent said magnet from attracting its armature, an electrically controlled stamp, means coöperating with the stamp for unbalancing said circuits, and a signal controlled by said magnet.

13. In a system of the class described, the combination with an electromagnet having two oppositely wound coils, of circuits in shunt to each other and including said two coils respectively, an electrically controlled stamp and an additional magnet in one of said shunt circuits, means for changing the resistance of said electrically controlled stamp, a lamp, and a circuit for said lamp including the armatures of both said magnets.

14. In a system of the class described, the combination with an electrically controlled stamp, a signal, an interrupter, of a circuit including said stamp and signal and controlled by said interrupter, and means for closing said circuit, the signal being constructed to have less impedance than the electrically controlled stamp, whereby the interrupter may cause operation of said signal without actuating said stamp.

15. In a system of the class described, the combination with an electromagnet having two oppositely wound coils and an armature; of a circuit wire branching to both of said coils; an electrically controlled stamp in circuit with one of said magnetic coils; means for changing the resistance of the stamp circuit, this resistance being normally equivalent to that of the circuit including the other magnet coil; and a lamp with a circuit therefor controlled by said armature.

16. In a system of the class described, the combination with a telephone line including a pair of telephone instruments; of a marking device located at one of the instruments; a switch controlling the operation of said marking device and located at the other instrument; means for indicating the presence or absence of the article to be marked; a relay controlling the operation of the indicating means; electrical connections from a single source of electrical energy to the telephone line, the marking device, and the relay controlling the indicating means; and other means controlling the circuit for the indicating means.

In testimony whereof I affix my signature in the presence of two witnesses.

VERNON F. KING.

Witnesses:
ROY C. GLASS,
CARL W. BEUST.